Figure 10:
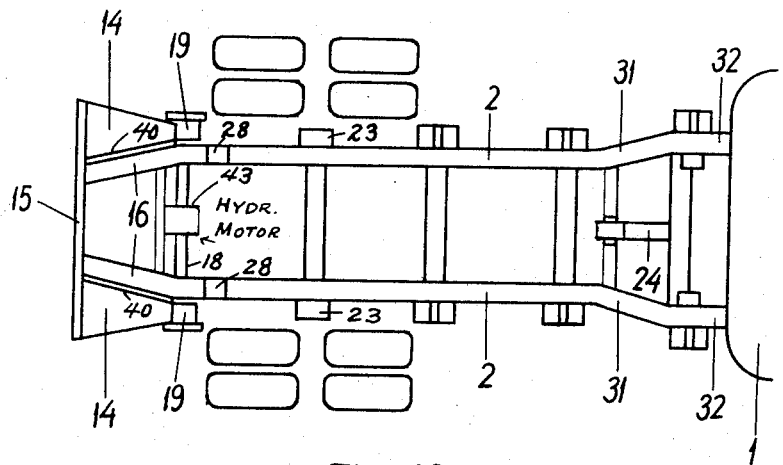

Oct. 26, 1965 MIKKO TERHO 3,214,048
PLATFORM ADAPTED TO ENGAGE AND TO DISENGAGE
THE CHASSIS OF A LORRY
Filed Oct. 30, 1963 6 Sheets-Sheet 1
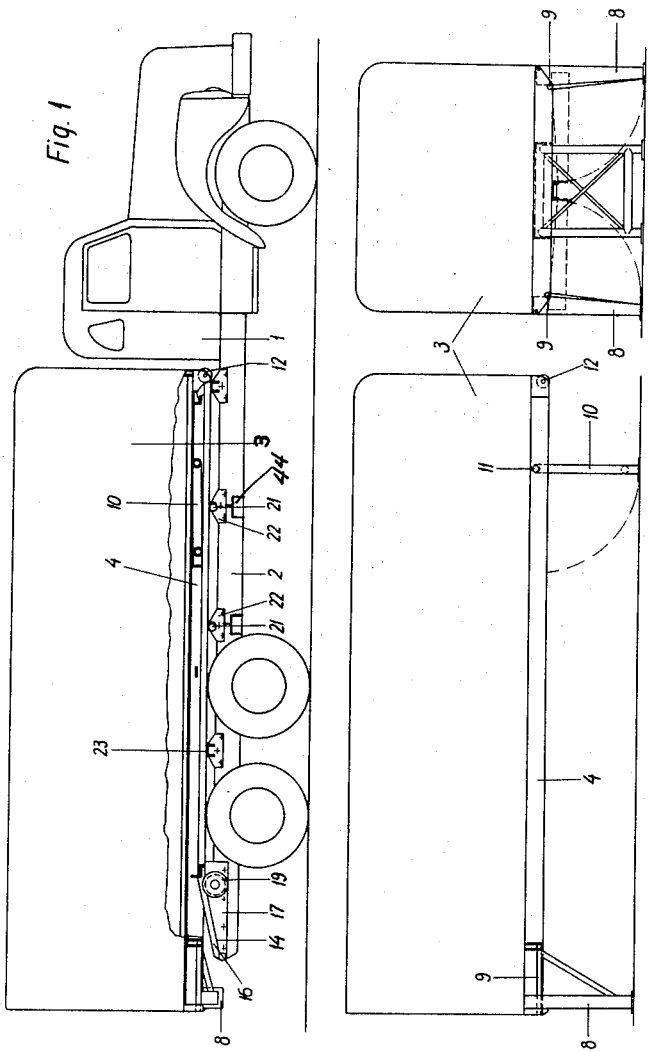
INVENTOR.
MIKKO TERHO
BY Herman L. Gordon
ATTORNEY Oct. 26, 1965 MIKKO TERHO 3,214,048
PLATFORM ADAPTED TO ENGAGE AND TO DISENGAGE
THE CHASSIS OF A LORRY
Filed Oct. 30, 1963 6 Sheets-Sheet 2
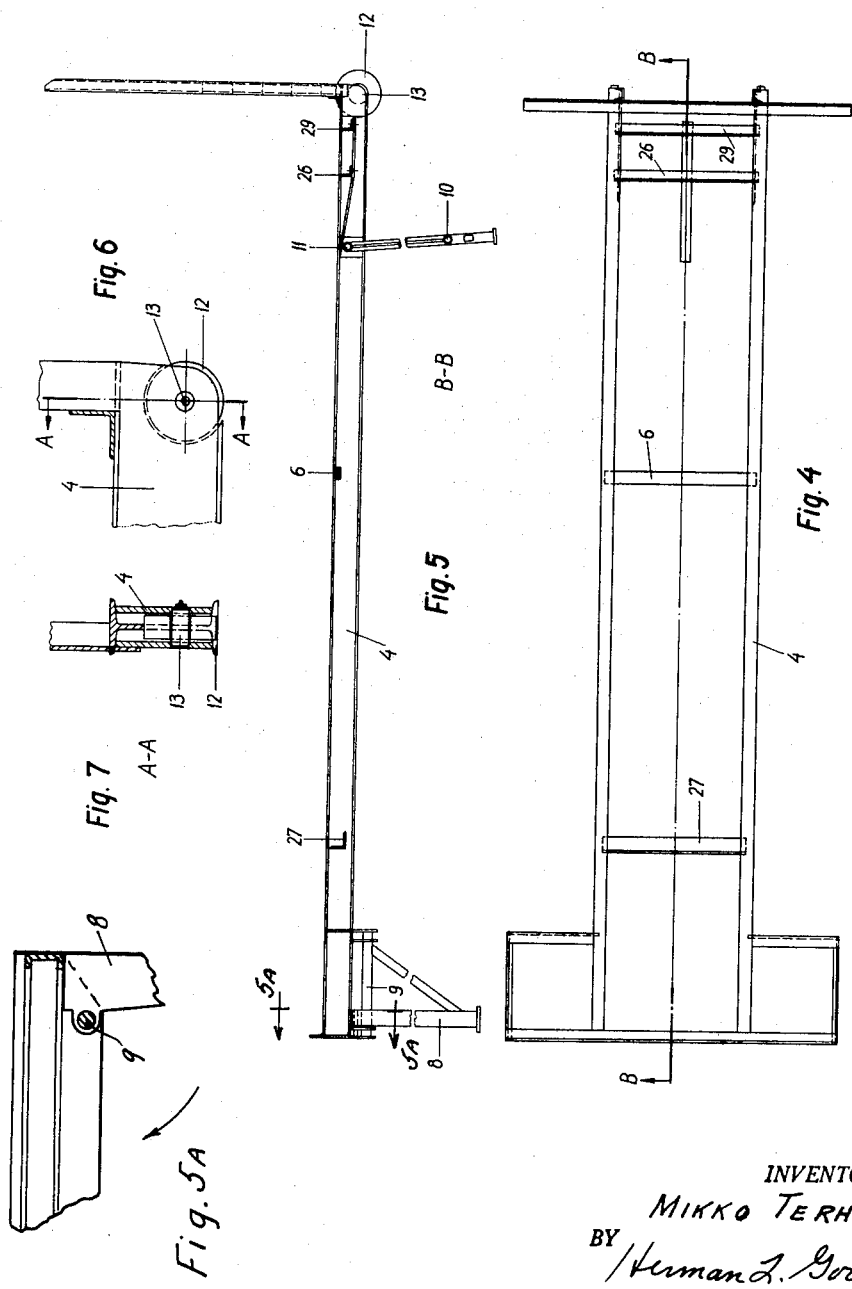
INVENTOR.
MIKKO TERHO
BY Herman L. Gordon
ATTORNEY

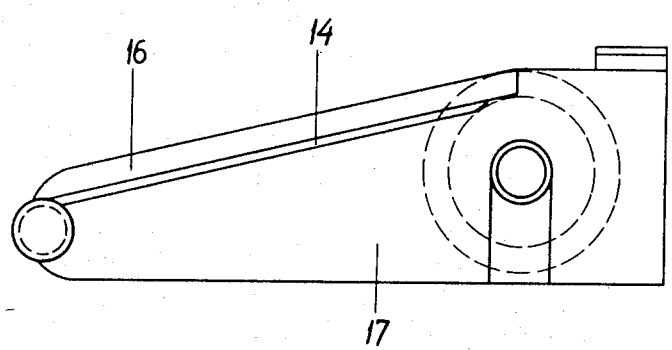
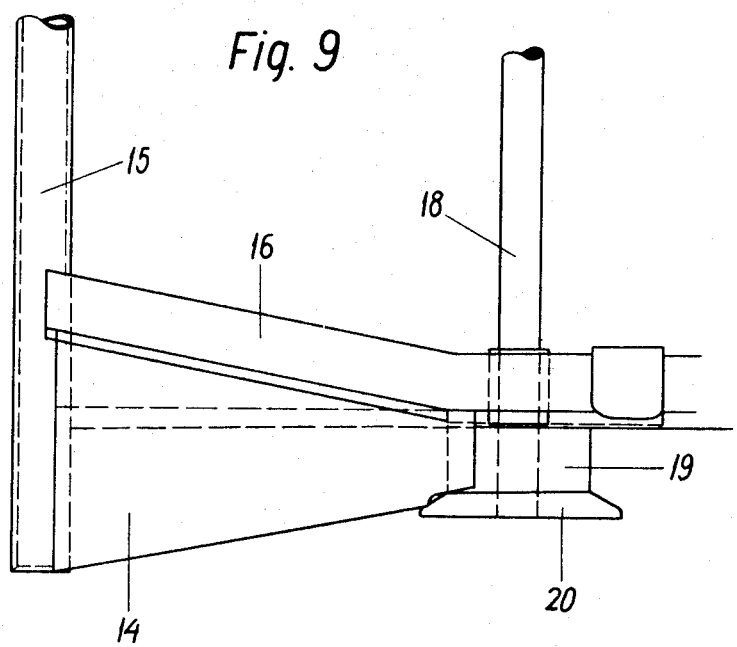

Oct. 26, 1965

MIKKO TERHO 3,214,048

PLATFORM ADAPTED TO ENGAGE AND TO DISENGAGE
THE CHASSIS OF A LORRY

Filed Oct. 30, 1963

6 Sheets-Sheet 4

INVENTOR.
MIKKO TERHO
BY Herman L Gordon

ATTORNEY

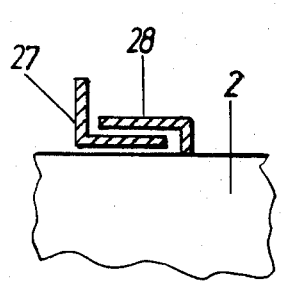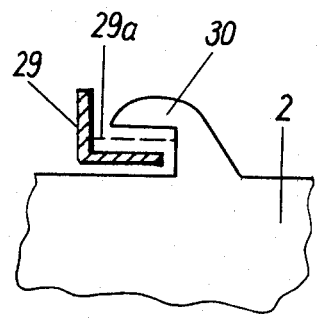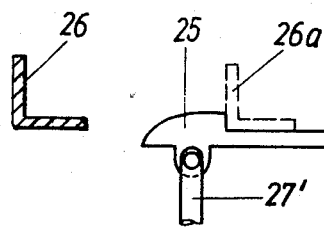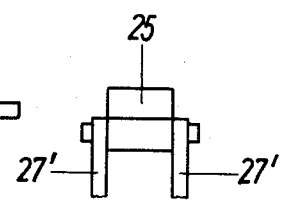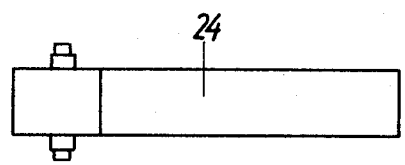

Oct. 26, 1965 MIKKO TERHO 3,214,048
PLATFORM ADAPTED TO ENGAGE AND TO DISENGAGE
THE CHASSIS OF A LORRY
Filed Oct. 30, 1963 6 Sheets-Sheet 6

INVENTOR.
MIKKO TERHO
BY Herman L. Gordon
ATTORNEY 3,214,048
PLATFORM ADAPTED TO ENGAGE AND TO
DISENGAGE THE CHASSIS OF A LORRY
Mikko Terho, Raisio, Finland
Filed Oct. 30, 1963, Ser. No. 320,611
3 Claims. (Cl. 214—516)

The invention concerned with here presents a platform adapted to disengage and to engage the chassis of a lorry into locking position relative to the chassis, as well as devices for this purpose in the vehicle chassis and the platform.

A novel feature of the invention is that the chassis is provided at its rear end with rearwardly inclined and widening plate-like members, engaging on rearward movement of the vehicle under rollers provided at the forward end of the detached platform resting on its supports, so that the forward end of the detached platform being supported by said rollers is moved upwardly along the before-mentioned plate-like members, while the front support of the platform loses contact with the ground, and that rollers provided at the rear end of the vehicle chassis engage under longitudinal rails provided under the platform, while the vehicle is moving further towards the rear under the platform, and when the vehicle has backed up sufficiently, the support at the front end of the platform is swung to horizontal position by the pushing action of the rear end of the vehicle, upon which the front end of the platform is able to sink downwardly, at the same time as the rear supports of the platform are leaving the ground and can be swung to horizontal position, upon which the platform by means of hydraulically driven rollers is able to move forward to its intended position on the chassis for locking automatically therewith and being disengageable therefrom only after unlocking, when the platform again can be lowered to the ground, or brought to rest on its supports, by starting the chassis' hydraulically driven end rollers, at which the platform supported by the rotating rollers is moved towards the rear until the point where the rear of said platform has tipped over sufficiently to rest on its rear supports, which have been swung to vertical position, the vehicle then being free to drive off from the platform while it is still engaging said rotating rollers, until the front support of the platform is able to swing by its own weight to approximately vertical position, and the front end of the platform is descending to rest on its front support, while the rollers on the front end of the platform are moving down along the plate-like and inclined members at the rear end of the chassis.

Figure 11A:
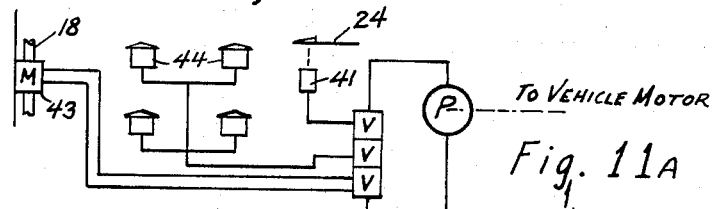
Figure 11:
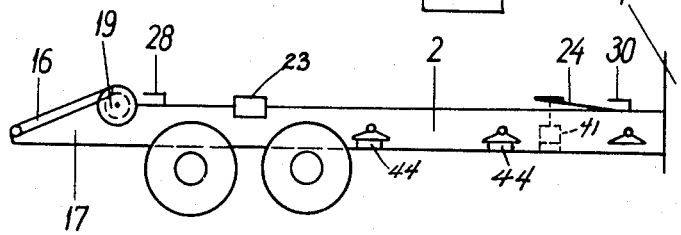
Figure 17:
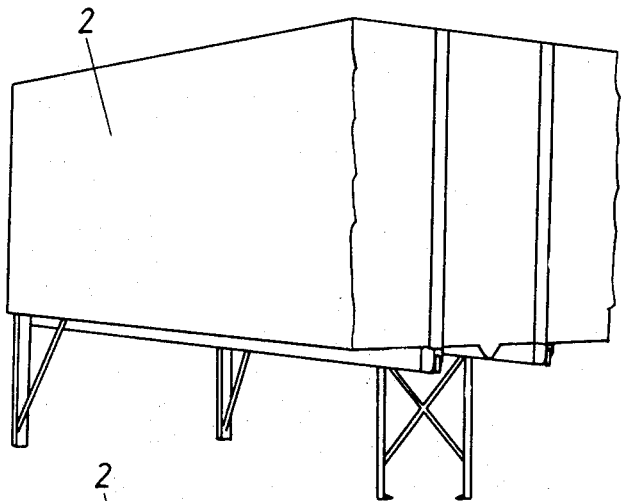
Figure 18:
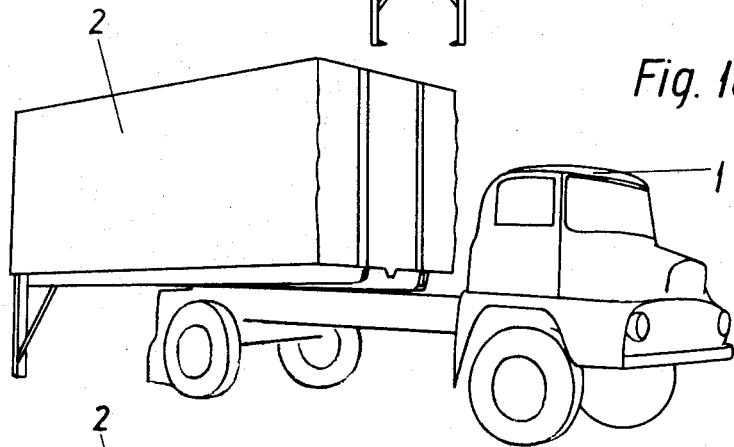
Figure 19:
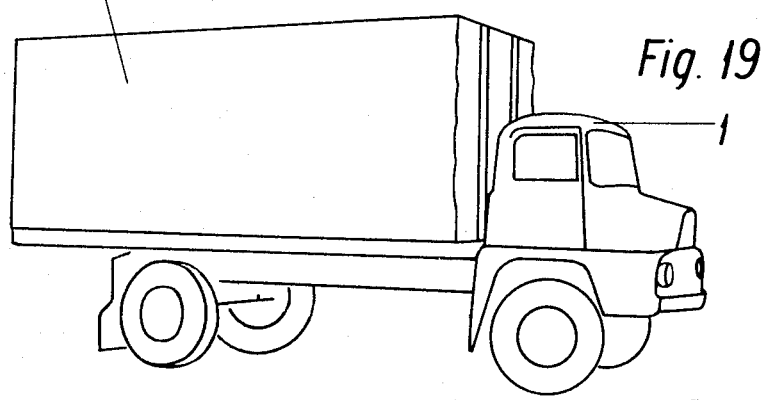

A working example of the invention is illustrated in the enclosed schematical drawings. FIG. 1 presents a side view of the platform of a lorry, according to the invention, attached to the chassis of the lorry. FIG. 2 is a side view of the platform in detached position on the ground resting on its own supports; FIG. 3, the same but from the rear; FIG. 4, a top view of the side and end bars of the platform; FIG. 5, the same thing but from the side; FIG. 5A, an enlarged sectional view taken on line 5A—5A of FIG. 5; FIG. 6, a detail in FIG. 5 on a larger scale from the side; and FIG. 7, a cross-sectional view taken in the direction of the arrow on the line A—A of FIG. 6; FIG. 8, an enlarged side view of the inclined plate-like members at the rear of the chassis; and FIG. 9, the same but from above. FIG. 10 presents a top view of the chassis of the lorry, and FIG. 11 the same but from the side. FIG. 11A shows a schematic diagram of the hydraulic system of the chassis. FIG. 12 presents an enlarged view from above of a spring plate connecting to the chassis, and FIG. 13 the same but from the side. FIG. 14 presents the same as FIGURES 12 and 13 but seen from one end. The FIGURES 12, 13 and 14 are presented on a larger scale than FIGURES 10 and 11. FIG. 15 presents a cross-sectional view of an angle bar constituting part of the base construction under the platform and the corresponding locking members connected to the chassis. FIG. 16 presents a similar view of another angle bar and the corresponding locking member. FIGURES 15 and 16 are on a larger scale than FIGURES 12–14. FIGURES 17–19 present a perspective view of the platform, and the chassis, according to the invention; the platform in FIG. 17 is standing alone resting on its supports; in FIG. 18 the lorry is moving rearwardly under the platform; and in FIG. 19 this phase of movement is over and the platform is in its final locked position on the lorry.

In FIG. 1 the symbol 1 designates the cabin of the vehicle, 2 the supporting bars of the vehicle, and 3 the platform, according to the invention, locked in position on said supporting bars. The platform is provided with longitudinal rails 4 connected to each other by angle bars 26, 27 and 29, as well as plate member 6.

The bottom of the platform, the side walls, and the end and rear walls are built on top of the supporting bars 4. Rear supports 8 secured on the rear part of the bars 4 are hingedly secured to longitudinal shafts 9 and are swingable towards each other to horizontal position under the platform and can be lowered from this position to the supporting position shown in FIGURES 2 and 3. During transport on the vehicle the rear supports 8 of the platform are lifted to horizontal position and are locked by any suitable means in that position. The platform is provided at its forward end with front supports 10, which are able to swing around transverse shaft 11 towards the rear likewise to horizontal position, and able from here to swing by their own weight to vertical position and somewhat further still in the forward direction, if necessary to locking position with the aid of special locking means.

The front end of bars 4 are provided with rollers 12 rotatable about shafts 13 in the manner shown in FIGURES 5, 6 and 7. The rear ends of the bars 2 in the vehicle chassis are provided with plate-like members 14, extending some distance diagonally towards the rear and downwardly, with forward ends narrower than rearward ends (FIGURES 9 and 10). The plate-like members 14 are connected to each other by a pipe 15. Connected to the inner edges of plates 14 facing each other are rails or guides 40, 40 extending upwardly from the plates, the rear ends of which guides converge toward each other in the same way as the plate-like members 14 become narrower towards their forward ends.

A shaft 18 connected to a hydraulic motor 43 extends rotatably through the supporting and reinforcing plates 17, supporting the plate-like members 14 from below, and the bars 2. Shaft 18 is at the same time the shaft of the hydraulic motor mentioned, extending on both sides of the motor towards the bars 2, being thus located between the bars 2. The hydraulic motor obtains its power from liquid compressed by a suitable hydraulic pump driven by the motor of the vehicle, the liquid being conducted to the hydraulic motor through suitable piping. The shaft 18 is provided at its extreme ends with rollers 19 having flanges 20. The surfaces of the rollers 19 may be suitably indented or provided with channels, grooves, spikes, or the like, so that the rollers while rotating are capable in an efficient manner of pushing a rail, or a similar body, ahead.

When the platform 3 is standing alone, on the ground, on a floor, or on its supports, in the position shown in FIGURES 2, 3 or 17, the platform can be taken up on the chassis of a motor vehicle by backing up the vehicle under the platform, this backing stage being presented in FIG. 18. The plate-like members 14 are then beginning to push in under the rollers 12 at the front end of the platform for contact. Consequently the rollers 12, on driving the vehicle slowly further in a rearward direction, are beginning to rotate along the inclined plate-like members 14, while at the same time raising upwardly and lifting the front supports of the platform out of contact with the ground. The rollers move along the plate-like members 14 on top of the rollers 19 and from here in a forward and gently sloping upward direction on the outside of the longitudinal bars 2 of the chassis, while the rails 4 of the platform are supported by rollers 19. Meanwhile the hydraulic motor is coupled free, so that the shaft 18 is rotating freely as the rails 4 are pushing forward over the rollers 19 which rotate on this account. The flanges 20 guide the rails 4 in order to keep them on the rollers 19. As the lower surface of rails 4 rearwardly of rollers 19 and the rear end of the vehicle also are situated below the upper surfaces of the bars 2 of the vehicle, bars 2 guide the forward and sloping upward movement of rails 4.

In the above described manner the motor vehicle moves rearwardly under the platform 3 and the rails 4 until an equilibrium is reached when the front portion of the platform, namely, that part which has pushed above the chassis of the vehicle over the rollers 19, weighs more than that portion of the platform which has not yet reached the rollers 19, at which the platform 3 tips over of its own weight, so that the rear supports 8 leave the ground and the front portion of the platform descends to a position approximately parallel to the bars 2 of the vehicle.

When the platform has dropped in the above manner to said approximately horizontal position over the rollers 19, said hydraulic motor is started e.g. from the driver's cabin of the vehicle, at which the rollers 19 begin to rotate and to push the rails 4 and the platform 3 in the forward direction of the vehicle chassis. To facilitate the forward motion of the rails 4 and the platform, the bars 2 are provided with rollers 21, each able to rotate about its own shaft while supporting said rails in their motion caused by the hydraulic motor and the rollers 19. The rollers 21 are journalled to supporting members 22 associated with the bars 2 and are able to rise to the positions indicated in FIG. 1 with the aid of hydraulic jack devices 44 utilizing pressure liquid compressed by the motor of the vehicle, and are able to stay in this position while the rails 4 are gliding over the rollers 21.

When the hydraulic motor driving the rollers 19 is started, the hydraulic jack devices 44, which bring the rollers 21 to the elevated position shown in FIG. 1 and locking them there, are started at the same time. When the platform 3 has pushed forward to the position shown in FIG. 1 and FIG. 19, the hydraulic pump is stopped, at which the rollers 21 move downwards automatically under the weight of the platform 3 at the same time and do not any longer support the rails 4, thus leaving the angle bars between the rails 4 to rest against the bars 2 or corresponding projections, i.e. the bars 2 of the vehicle thus support the angle bars 26, 27 and 29 as well as the plate iron 6 and by way of these, the bars 4 and the platform 3. Also the projection 23 on the bars 2 may contribute to the support of the rails 4 when the platform 3 is in transport position as shown in FIG. 1.

The vehicle body is also provided with a leaf spring 24, FIGURES 10–14, with a bevelled shoulder 25 at its rear end as shown in FIGURES 12 and 13. When the platform 3 is moving relatively forward in the direction of the chassis, the angle bar 26 extending crosswise under the platform pushes over the shoulder 25 at the rear portion of the leaf spring 24 and at the same time presses the leaf spring 24 downwards against its spring power, so that the angle bar 26 finally reaches the position 26a indicated by dotted lines in FIG. 13, and is locked in this position by the forward end of the leaf spring shoulder which thus keeps the platform in place, so that it cannot move in the rearward direction of the vehicle.

In order to disengage the platform of the vehicle from the chassis and to bring it to stand separately on its supports, the hydraulic power means is started from the driver's cabin to begin with, utilizing liquid compressed by the vehicle motor as the power medium. The power means operates a suitable hydraulic device 41 to pull down the arms 27' hinged to the shoulder 25, the upper surface of which will then be situated below the angle bar 26a. After this the hydraulic motor above mentioned is started but in the opposite direction to that in which the platform is moved on the chasis. Simultaneously also the hydraulic jack means 44 associated with the supporting members 22 of rollers 21 start automatically to elevate the rollers 21 including supporting members 22 to the height indicated in FIG. 1. Then the platform 3 starts to move rearwardly with its rails 4 supported by rollers 21 and 19, until the rear portion of the platform, or the part reaching beyond the rollers 19 in the rearward direction, has a larger weight than that part of the platform which is located in front of the rollers 19, at which the rear part of the platform tips downwards. Prior to this moment the rear supports 8 of the platform are released and allowed to swing from the horizontal position in FIG. 1 to the vertical position shown in FIGURES 2 and 3. When the lower ends of the supports touch the ground due to the platform tipping over rollers 19, the vehicle is brought slowly forward. The hydraulic motor 43 may at this stage of operations still be running and at the same time pushing the platform rearwardly, but the hydraulic motor may also either be stopped right after the vehicle has begun to move forward, or a little later, whereupon the hydraulic motor is coupled free and the rollers 19 are enabled to rotate of themselves under the rails 4.

When the front supports 10 in their horizontal transport position have bypassed the pipe 15 rearwardly they are free to swing down of their own weight to vertical position and are swung still somewhat further in the forward direction to locked supporting positions. Said swinging of the front supports somewhat forwardly past the vertical position is necessary because in this position the supports 10 of the platform are more stable than if they were exactly vertical. Correspondingly, on driving the vehicle chassis rearwardly under the platform, the front supports 10 after leaving the ground come into contact with the transverse pipe 15, which forces them to swing backwards to stay in horizontal position under the platform received by the chassis, as shown in FIG. 1.

Locking of the rear end of the platform to the chassis with platform in transport position on the chassis takes place by the flanges of the angle bars 27 moving under the corresponding flange 28 which is attached to bars 2 of the chassis. FIGURE 16 shows a cross-section of the angle bar 27 and the flange 28 in the direction of a bar 2. In the corresponding manner the horizontal flange of angle bar 29 at the forward end of the platform moves under the flanges 30 on the bars 2 of the chassis. The flanges 28 and 30 prevent the platform from upward movement away from the chassis due to force, blows or vibration. FIGURE 15 shows a corresponding sectional view as FIG. 16 indicating that the space between the flange 30 and the upper surface of bar 2 is wider than the space between flange 28 and the upper surface of bar 2. A wider intermediate space is necessary in order to have the horizontal flange of the angle bar in FIG. 15 take the upper position 29a indicated by dotted lines, at the time when the rollers 21 are still supporting the rails 4, and drops from its position 29a down against bar 2 at the time when the rollers 21 have occupied their respective lower positions.

As the rearward ends of the inclined plate-like members 14 are wider than the forward ends, the rear end of the vehicle in rearward movement does not always have to hit exactly the same spot in the horizontal plane relative to the rollers 12 at the front end of the platform, because as soon as the plate-like members 14 are supporting the rollers 12 and the front end of the platform 3, said rollers are guided by the rails 16 in such a way that they enter on top of the rollers 19. Also the bars 2 of the chassis are a little bent at their forward ends, i.e. they diverge at points (32) 31 (FIG. 10) away from each other, so that the front ends of the bars 2 are further away from each other than in other parts along the bars 2. However, the rails 4 of the platform are at all points at the same distance from each other, and at such a distance, that the rails 4 fall on the outside of the front ends 32 of the bars 2. On this account the position of the rails 4 outside of the rear ends of the bars 2 may vary somewhat in the horizontal plane, but are nevertheless always situated between the exterior surfaces of the rear ends of bars 2 and the flanges 20 on the rollers 19. Accordingly, the centre line between the rails 4 of the platform may occupy slightly different positions at its rear end in relation to the centre line between the bars 2 of the chassis of the vehicle at its rear end when the platform is in transport position. However, the front ends of said centre lines are always approximately in the same position mutually. Even if the centre lines are not quite in the same place and coincide, this is not dangerous with the location of the centre of gravity of the platform in mind in relation to the chassis of the vehicle, but it facilitates the backing up of the vehicle under the platform, because on approaching the platform the rollers 12 do not necessarily have to receive the plate-like members of the chassis exactly at the same place in the horizontal plane.

The invention is not restricted to the working examples described above and illustrated in the drawings and can be varied in several ways within the scope of the patent claims following below.

It is clear that the platform within the scope of the invention can be furnished also with hooks, or the like, on which for instance the wire of a crane can be fastened. Then the platform can be lifted, e.g. in the harbour by means of a crane, into a ship or from a ship. The platforms then are brought to the harbour for loading in the ordinary manner with motor vehicles intended for transporting platforms of this type and are, e.g. abroad, transported from the harbour concerned by other motor vehicles, which likewise are provided with devices for this type of platform. Said platforms can also be transported, e.g., to an autoferry and carried away by suitable trucks, tractors, driven trailers, etc. The transport to and from the harbour is nevertheless carried out by using motor vehicles equipped with the above described devices for handling the platform.

Also the trailer of a motor vehicle can be furnished with corresponding devices, instead of the chassis of the vehicle, or both, so that the platform can be received by the trailer and detached therefrom in the same manner as has been described above.

I claim:
1. In combination, a truck having a chassis comprising a pair of longitudinally extending side members, transversely extending means connecting said side members, downwardly and rearwardly inclined, rearwardly flaring guide plates at the rear ends of said side members, outwardly flanged rollers on the rear portion of said chassis at the forward ends of said guide plates, the forward ends of said guide plates being disposed immediately adjacent to and leading to the upper portions of said rollers, a transverse shaft journalled to the chassis and drivingly connected to said rollers, a hydraulic motor drivingly connected to the intermediate portion of said shaft, longitudinally spaced supports adjacent the intermediate portion of each side member, rollers journalled in the top ends of said supports, hydraulic elevating means operatively connected to said supports, a platform member adapted to be removably supported on said chassis, said platform member comprising a cargo-supporting body, a front support pivoted to the forward end of said body on a transverse horizontal axis, said front support being swingable to a depending supporting position, a pair of spaced rear supports pivoted to opposite sides of the rear portion of said body on longitudinal horizontal axes and being swingable to depending supporting positions, a pair of longitudinal depending bars secured to the bottom of said body and being spaced to be first received on said first-named rollers between the flanges thereof and to be subsequently received on said second-named rollers as the chassis moves longitudinally rearwardly beneath said body, respective additional rollers on the forward ends of said bars engageable on said guide plates, the distance between the intermediate portions of said side members being less than the distance between said bars, transversely extending means connecting the side members and engageable with said front support responsive to the rearward movement of the chassis beneath the platform member to swing said front support to a position beneath and substantially parallel to said body, upwardly biased resilient catch means on the chassis lockingly engageable with the platform member responsive to the rearward movement of the chassis beneath the platform member to a position wherein the major portion of the chassis underlies the platform member, and hydraulic release means connected to said catch means for at times moving the catch means downwardly toward release position.

2. The structure of claim 1, and wherein said guide plates have forwardly divergent inner margins provided with upstanding guide rail elements.

3. The structure of claim 1, and wherein the forward end of the chassis is provided with a rearwardly facing hook member lockingly engageable over a portion of the platform member spaced forwardly of the catch means as said catch means lockingly engages the platform member.

References Cited by the Examiner
UNITED STATES PATENTS

| | | | |
|---|---|---|---|
| 2,116,150 | 5/38 | Howie et al. | 214—84 |
| 2,156,438 | 5/39 | Suverkrup | 214—508 X |
| 2,672,993 | 3/54 | Lee | 214—84 |
| 3,074,575 | 1/63 | Terho | 214—515 |

FOREIGN PATENTS

| | | |
|---|---|---|
| 93,476 | 9/59 | Netherlands. |

HUGO O. SCHULZ, *Primary Examiner.*
GERALD M. FORLENZA, *Examiner.*